(12) United States Patent
Albert et al.

(10) Patent No.: US 8,684,033 B2
(45) Date of Patent: *Apr. 1, 2014

(54) TWO-SHUTTER VALVE

(75) Inventors: Laurent Albert, Vallangoujard (FR); Arnold Rimpau, Braunschweig (DE)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 961 days.

This patent is subject to a terminal disclaimer.

(21) Appl. No.: 12/298,004

(22) PCT Filed: Apr. 26, 2007

(86) PCT No.: PCT/IB2007/001096
§ 371 (c)(1),
(2), (4) Date: Jan. 12, 2009

(87) PCT Pub. No.: WO2007/129172
PCT Pub. Date: Nov. 15, 2007

(65) Prior Publication Data
US 2009/0293973 A1  Dec. 3, 2009

(30) Foreign Application Priority Data
Apr. 26, 2006 (FR) .................................. 06 03711

(51) Int. Cl.
*F16K 1/22* (2006.01)
*F24F 13/15* (2006.01)
*F16K 35/14* (2006.01)
*F16K 11/16* (2006.01)
*F16K 31/04* (2006.01)
*F16K 31/53* (2006.01)

(52) U.S. Cl.
USPC .............. 137/601.11; 137/630.19; 137/637.1; 137/865; 137/870; 251/79; 251/248

(58) Field of Classification Search
USPC ................. 137/607, 862, 865, 870, 871, 637, 137/637.1, 304, 305, 306, 630.19, 601.11; 251/248, 79, 80, 83
See application file for complete search history.

(56) References Cited

U.S. PATENT DOCUMENTS 2,828,768 A * 4/1958 Adams ..................... 137/630.16
4,749,004 A   6/1988 Peash
(Continued)

FOREIGN PATENT DOCUMENTS

DE  3108090  9/1982
DE  4401559  5/1995
(Continued)

OTHER PUBLICATIONS

International Search Report dated Oct. 21, 2008 (4 pages).
(Continued)

*Primary Examiner* — Craig Schneider
*Assistant Examiner* — Atif Chaudry
(74) *Attorney, Agent, or Firm* — Osha Liang LLP

(57) ABSTRACT

A valve including a body that defines first and second ducts that open out into a third duct. The first duct is provided with a first shutter and the second duct is provided with a second shutter connected to drive means arranged to move the shutters in a normal mode of operation in which the second shutter is in the closed position and the first shutter is adjustable in position between an open position and a first closed position, a stop mode in which the second shutter is in its closed position and the first shutter is in its first closed position, and a secondary mode of operation in which the second shutter is in its open position and the first shutter is in a second closed position.

18 Claims, 4 Drawing Sheets

(56) References Cited

U.S. PATENT DOCUMENTS

| | | | |
|---|---|---|---|
| 5,035,262 A * | 7/1991 | Schweikert | 137/607 |
| 5,617,726 A * | 4/1997 | Sheridan et al. | 60/605.2 |
| 7,992,589 B2 * | 8/2011 | Albert et al. | 137/637.1 |
| 2003/0051759 A1 * | 3/2003 | Schmidt et al. | 137/862 |
| 2005/0241702 A1 | 11/2005 | Blomquist et al. | |

FOREIGN PATENT DOCUMENTS

| | | |
|---|---|---|
| EP | 0388505 | 9/1990 |
| EP | 1170487 | 1/2002 |
| FR | 2876419 A1 | 4/2006 |

OTHER PUBLICATIONS

Patent Abstract from esp@cenet, Publication No. EP0388505 (A2), Publication Date: Sep. 26, 1990, 1 page.

Patent Abstract from esp@cenet, Publication No. DE4401559 (C1), Publication Date: May 18, 1995, 1 page.

Patent Abstract from esp@cenet, Publication No. DE3108090 (A1), Publication Date: Sep. 16, 1982, 1 page.

Office Action issued in corresponding Chinese Patent Application No. 200780014177.5, dated Apr. 12, 2010, and English translation thereof (9 pages).

* cited by examiner

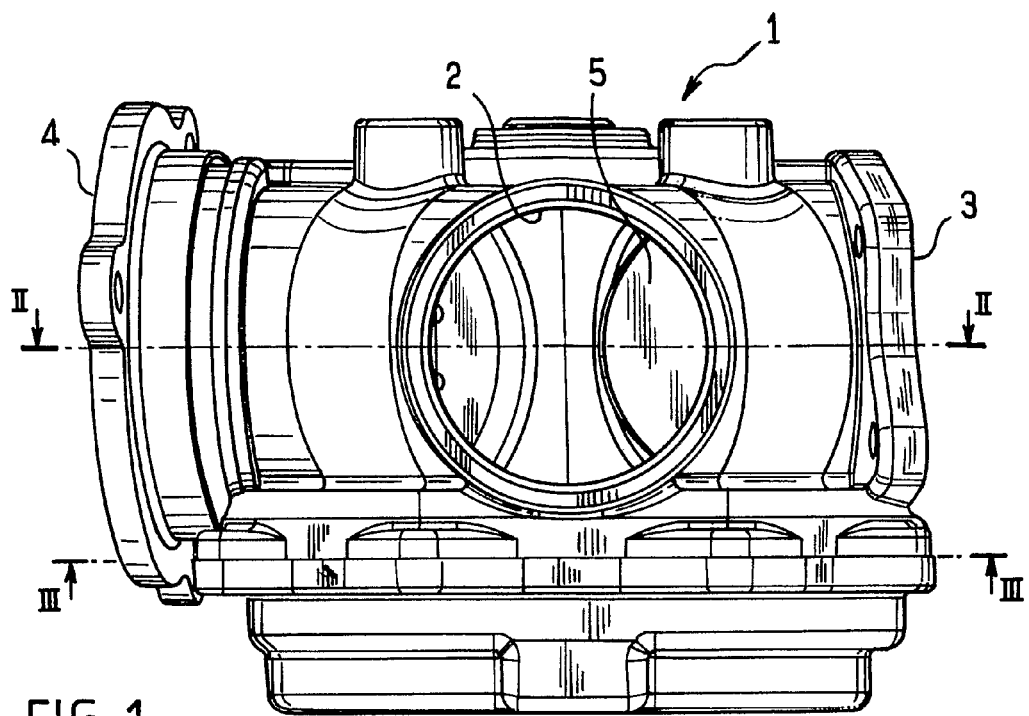
FIG_1
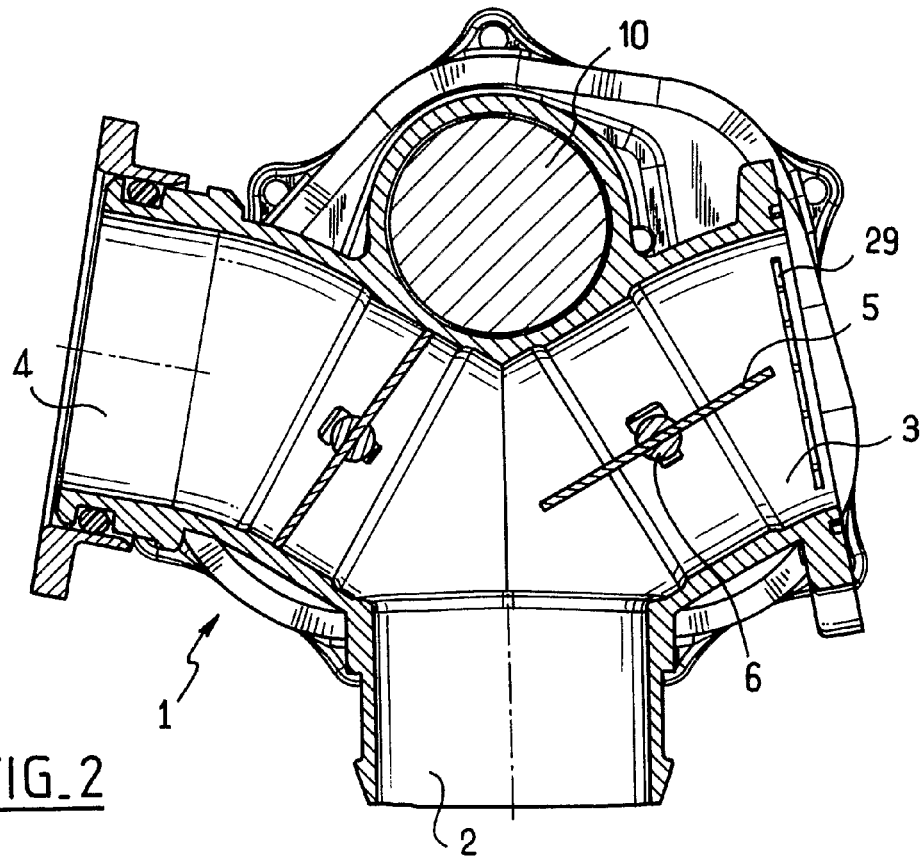
FIG_2

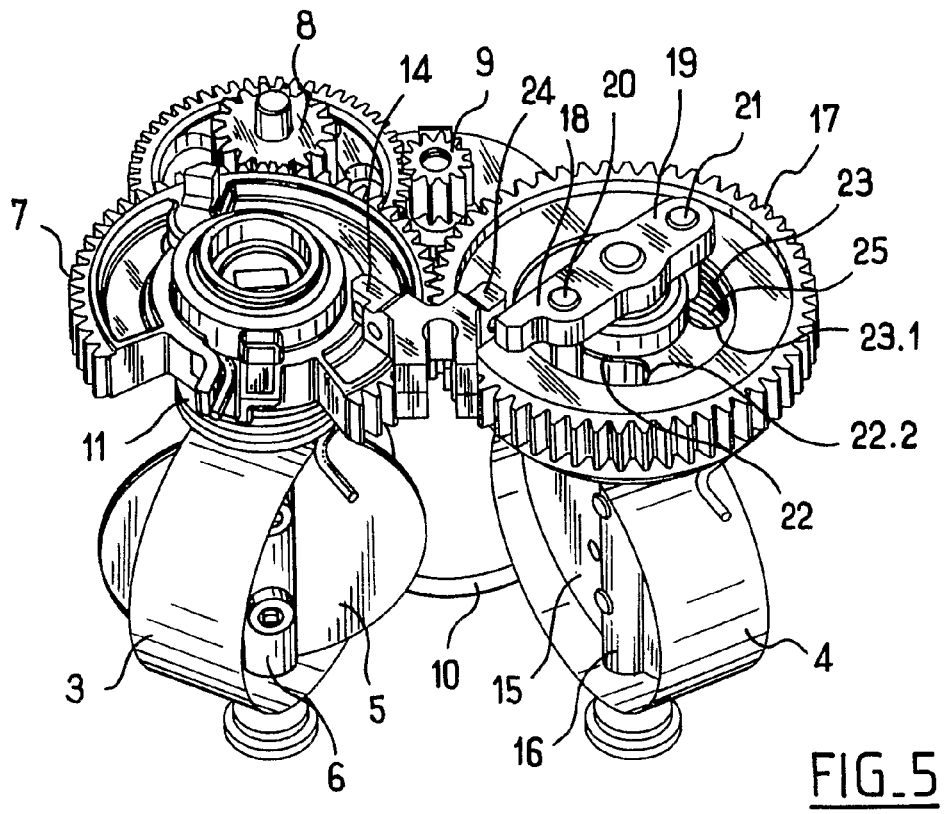
FIG_5
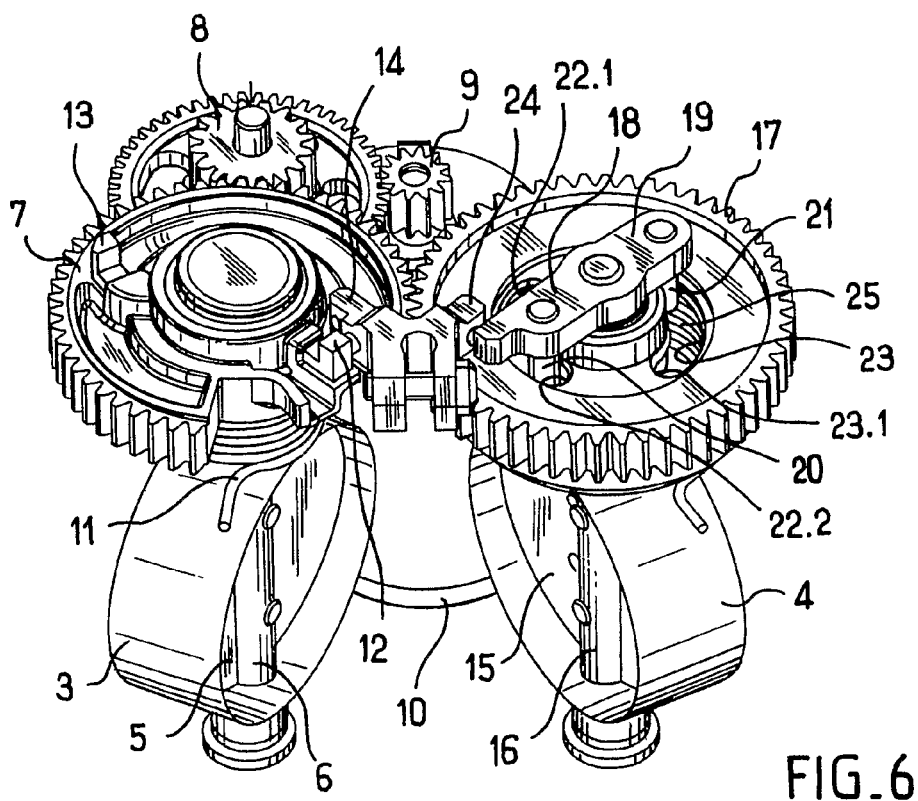
FIG_6

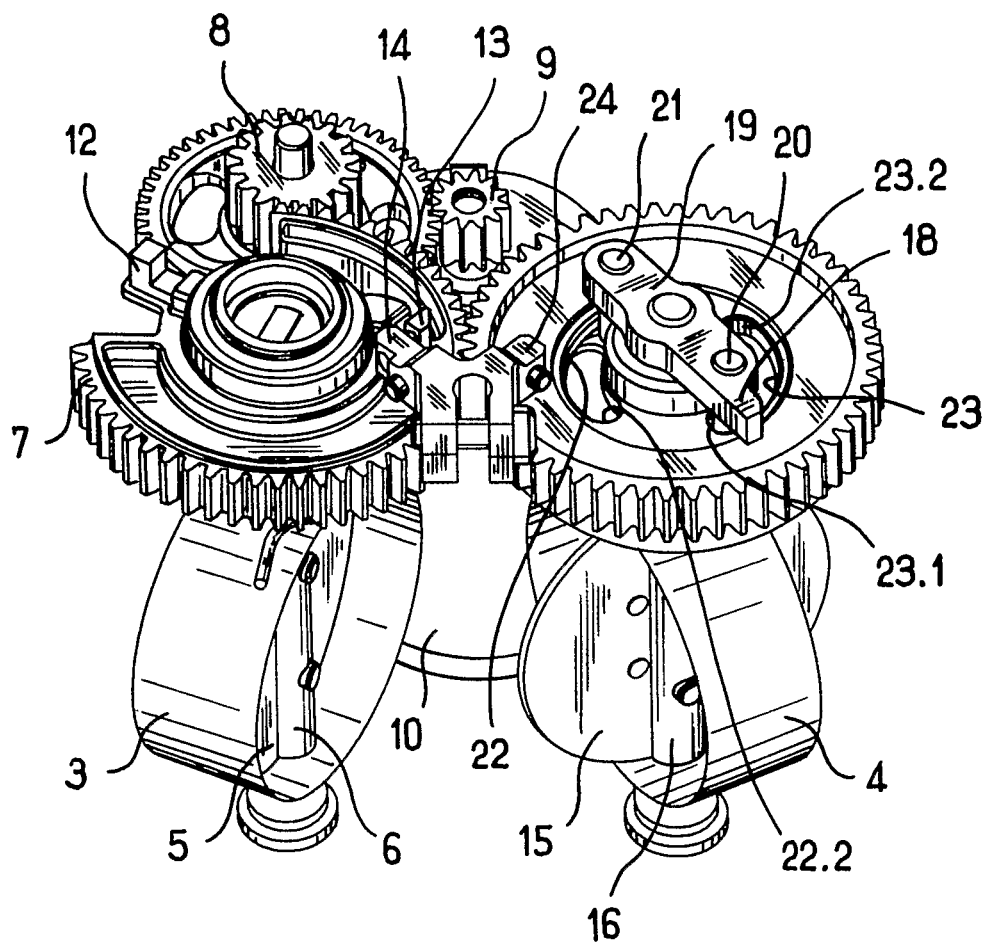
FIG_7

TWO-SHUTTER VALVE

The present invention relates to a valve for installing, for example, in an air intake circuit of an engine.

BACKGROUND OF THE INVENTION

Such an intake circuit comprises a cooled path and a non-cooled path which are both connected to the intake of the engine via valves. It results that the engine has important weight and bulk making delicate the setting up of the engine on the vehicle, a relative complexity making difficult the engine maintenance and a high number of parts increasing the risk of failure.

OBJECT OF THE INVENTION

In the context of the invention, those valves are replaced by a single valve comprising a body defining a first duct and a second duct, which ducts are respectively connected to the non-cooled path and to the cooled path, and both of which open out into a third duct that is connected to the intake. The first duct and the second duct are provided respectively with a first shutter and a second shutter each having an open position and a closed position An object of the invention is to provide valve control means that are simple and inexpensive.

SUMMARY OF THE INVENTION

To this end, the invention provides a valve comprising a body defining first and second ducts that open out into a third duct and that are provided respectively with a first shutter and with a second shutter connected to drive means arranged to move the shutters in:
  a normal mode of operation in which the second shutter is in the closed position and the first shutter is adjustable in position between an open position and a first closed position;
  a stop mode in which the second shutter is in its closed position and the first shutter is in its first closed position; and
  a secondary mode of operation in which the second shutter is in its open position and the first shutter is in a second closed position.

The first shutter is capable of being held in position between the open position and the closed position in order to adjust the throttling it performs, while the second shutter is capable of being moved either into its open position or into its closed position, without any intermediate position being necessary. The valve thus possesses: a normal operating state in which the first shutter is adjusted in position between its open position and its closed position, while the second shutter is closed; a blocked state in which the first shutter and the second shutter are both in the closed position; and a cooling state in which the first shutter is in the closed position and the second shutter is in the open position. The valve can thus be substituted to several valves.

Preferably, the drive means comprise a first transmission wheel and a second transmission wheel respectively associated with the first shutter and the second shutter and connected to an outlet shaft of an actuator motor to be movable between the closed and open positions for the ducts.

That embodiment is particularly simple.

Preferably, the actuator motor is a DC (direct current) motor.

Such a motor delivers torque that is greater than the torque developed by a torque motor.

Other characteristics and advantages of the invention appear on reading the following description of a particular, non-limiting embodiment of the invention.

BRIEF DESCRIPTION OF THE DRAWINGS

Reference is made to the accompanying drawings, in which:

FIG. 1 is an elevation view of a butterfly valve constituting a first embodiment of the invention;

FIG. 2 is a section view on line II-II of FIG. 1;

FIG. 5 is a fragmentary perspective view, the first shutter being in an intermediate position between its first closed position and its open position, and the second shutter being in its closed position;

FIGS. 6 and 7 are views analogous to FIG. 5, the first shutter being in its second closed position and the second shutter being respectively in its closed position and its open position.

DETAILED DESCRIPTION OF THE INVENTION

Figure 3:
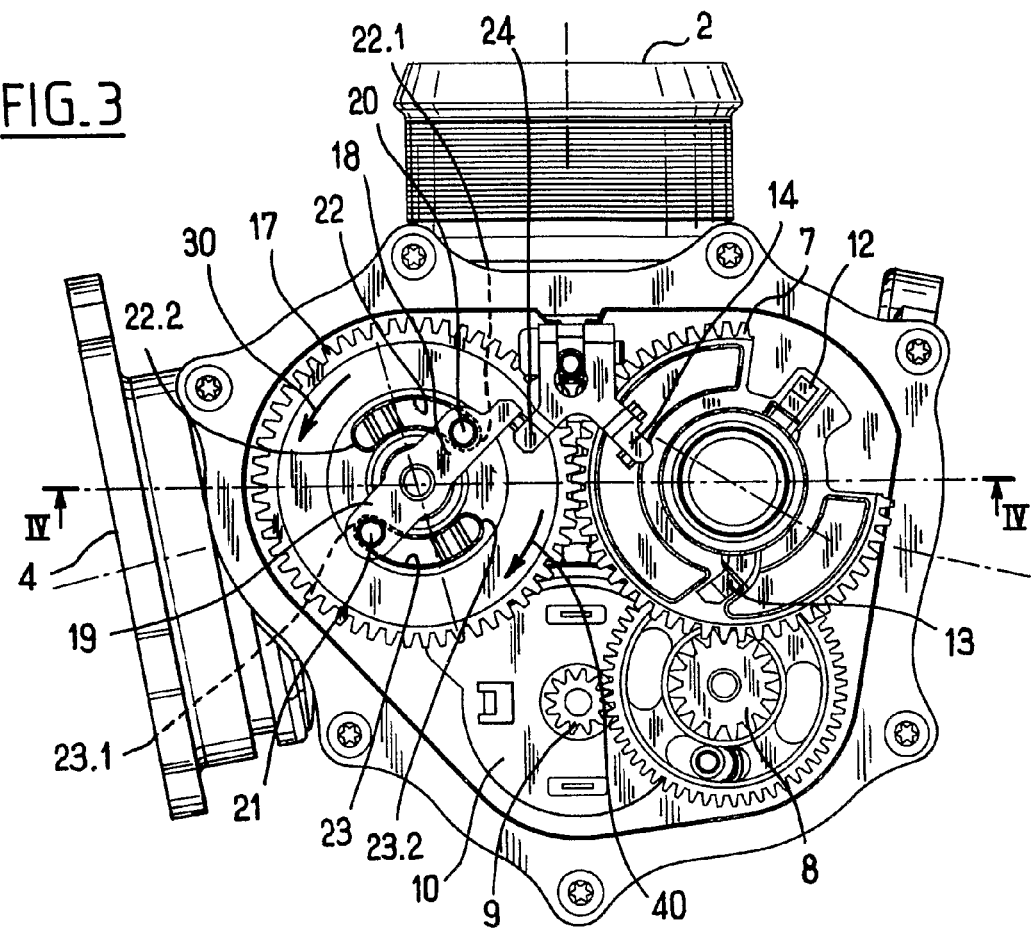
FIG. 3 is a section view on line III-III of FIG. 1, the first shutter being in its open position and the second shutter being in its closed position.
Figure 4:
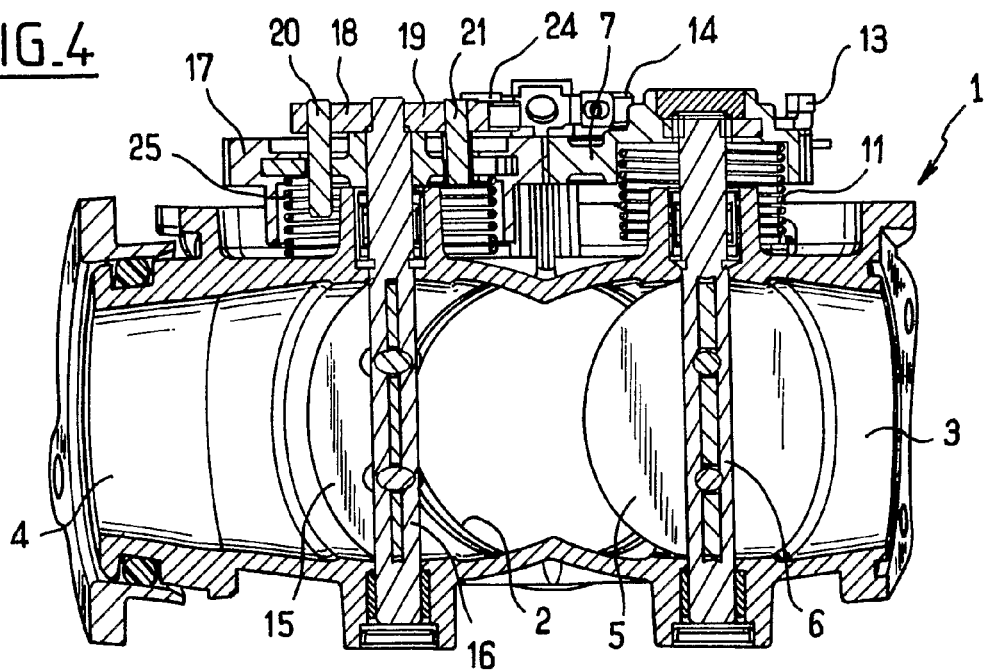
FIG. 4 is a section view on line IV-IV of FIG. 3.

With reference to FIGS. 1 to 7, the valve of the invention comprises a body given overall reference 1 defining a first duct 3 and a second duct 4 opening out into a third duct 2. The body 1 and the ducts 3 and 4 are shown in part only in FIGS. 5 to 7.

The first duct 3 is fitted with a first double-shutter or butterfly element 5 secured to a shaft 6 mounted to pivot relative to the body 1. The shaft 6 has an end that projects from the body 1 and that is constrained to rotate with a first toothed transmission wheel 7 meshing with an intermediate gearwheel 8, itself meshing with a pinion 9 secured to the outlet shaft of a motor 10 mounted on the body 1. The motor 10 is a conventional DC motor connected to an electrical power supply and to a control module that are likewise conventional and not shown in the figures. A torsion spring 11 extends helically around said end of the shaft 6, having one end connected to the transmission wheel 7 and one end connected to the body 1. The spring 11 returns the butterfly element 5 to the open position (shown in FIGS. 2 to 4). The transmission wheel 7 is provided with studs 12, 13 for co-operating with an abutment 18 secured to the body 1. When the stud 12 is in abutment against the abutment 14, the butterfly element 5 is in a first closed position (shown in FIG. 6), and when the stud 13 bears against the abutment 14, the butterfly element 5 is in a second closed position (shown in FIG. 7). The butterfly element 5 is substantially perpendicular to the duct 3 both when it is in its first closed position and when it is in its second closed position, these positions being at about 180° from each other. Heater resistance elements, shown diagrammatically at 29, extend in the duct 3 downstream from the butterfly element 5 and are secured to the body 1. The resistance elements 29 allow the fluid to pass and they are in the form of aluminum fins or fine resistive tapes of thickness and shapes that are arranged to avoid hindering or disturbing the flow of the fluid. The resistance elements 29 include means, that are known in themselves and not shown, connecting them to an electricity power supply.

The second duct 4 is fitted with a second double-shutter or butterfly element 15 secured to a shaft 16 that is mounted to pivot relative to the body 1 and that possess an end projecting from the body 1, having a second transmission wheel 17 mounted to pivot thereon. A support is secured to said end of the shaft 16. The support defines two arms 18, 19 extending radially from the projecting end of the shaft 6, away from each other. Each arm 18, 19 is provided with a respective finger 20, 21 received in a respective circularly-arcuate groove 22, 23 formed in the transmission wheel 17. The arm 19 has a free end for coming into abutment against an abutment 24 secured to the body 1 and defining the closed position of the butterfly element 15 (shown in FIGS. 2 to 6). A torsion spring 25 extends helically around said end of the shaft 16 and possesses one end connected to the finger 21 and an opposite end connected to the body 1 to return the butterfly element 15 towards the closed position. In the open position, the butterfly element 15 extends substantially along the axis of the duct 4.

The abutments 14 and 24 are secured to a support that is adjustable in position relative to the body 1.

The valve as made in this way possesses:
  a normal or primary mode of operation in which the butterfly element 15 is in the closed position and the butterfly element 5 is adjustable in position between its open position and its first closed position (intermediate position shown in FIG. 5);
  a stop mode in which the butterfly element 15 is in its closed position and the butterfly element 5 is in its first closed position (FIG. 6); and
  a secondary mode of operation in which the butterfly element 15 is in its open position and the butterfly element 5 is in its second closed position (FIG. 7).

In the normal operation mode, the motor 10 can bring the butterfly element 5 into any position lying between its open position and its first closed position (see the intermediate position shown in FIG. 5). When the butterfly element 5 is in the open position (FIG. 3), the fingers 20, 21 are each received in one end 22.1, 23.1 of the respective grooves 22, 23. When the transmission wheel 7 pivots between the open position of the butterfly element 5 and its first closed position, the transmission wheel 7 drives the transmission wheel 17 (rotating in the direction 40 in FIG. 3), thereby causing the fingers to slide along the grooves 22, 23 towards the opposite ends 22.2 and 23.2 of said grooves. The butterfly element 15 thus remains stationary, being held in its closed position by the spring pressing the projection of the arm 18 against the abutment 24.

When the butterfly element 5 is in its first closed position, the fingers 20, 21 are received in the ends 22.2, 23.2 of the grooves 22, 23, and the butterfly element 15 is in its closed position, such that the valve is in its stop mode (FIG. 6).

When the butterfly element 5 is returned towards its open position from its first closed position, the transmission wheel 7 entrains the transmission wheel 17 and the fingers move from the ends 22.2 and 22.3 of the grooves 22 and 23 to their ends 22.1 and 23.1, without causing the butterfly element 15 to move.

When the transmission wheel 7 is moved to bring the butterfly element 5 into its second closed position, the transmission wheel 7 causes the transmission wheel 17 to turn in the direction referenced 30 in FIG. 3. Since the fingers 19, 20 are in abutment against the ends 22.1 and 23.1 of the grooves 22, 23, the pivoting of the transmission wheel 17 causes the support pivot, and thus causes the shaft 16 of the butterfly element 15 to pivot. When the butterfly element 5 reaches its second closed position, the butterfly element 15 is in its open position. The valve is in its secondary mode of operation (FIG. 7).

When the butterfly element 5 is returned from its second closed position towards its open position (likewise under the action of the spring 11), the transmission wheel 17 is driven in the opposite direction (direction referenced 40) by the transmission wheel 7, and the spring 25 exerts a force on the finger 21 returning the butterfly element 5 towards its closed position.

The fingers 20, 21 and the grooves 22, 23 thus form a one-way drive member (direction 30) for the butterfly element 15, said member being positive (or active) when the butterfly element 5 is driven from its open position towards its second closed position.

It should be observed that the shafts 6, 16 of the butterfly elements 5, 15 are installed in the vicinity of the third duct 2, and that:
  in the open position, the butterfly elements 5, 15 have portions projecting into the duct 2, preferably as far as the axis of the duct 2, so as to guide gas flow and form deflectors; and
  in the closed position, the butterfly elements 5, 15 extend in the vicinity of the wall of the duct 2, and are preferably substantially flush with the duct and parallel to the wall thereof, so as to limit the formation of a gas recirculation zone and other disturbances in the flow so as to ensure that head losses are low.

Naturally, the invention is not restricted to the embodiments described above and variant embodiments can be provided without going beyond the ambit of the invention as defined by the claims.

In particular, the valve may have a structure that is different from that described, in particular concerning the arrangement of the ducts, the shape of the butterfly elements, drive to the second transmission wheel, the butterfly element drive means .... The transmission wheels may be driven by means of belts. The motor may engage with the first transmission wheel and with the second transmission wheel, the first transmission wheel then no longer serving as a connection between the motor and the second transmission wheel. The body may be made up of one or more parts. In place of a shutter in form of butterfly type double flap, a simple flap can be used.

The return member for the second butterfly element may be a mechanical drive member or an electric motor.

The one-way drive member may be of a structure other than that described, and for example it could have only one finger and one groove. A finger may also be secured to the transmission wheel 17 in order to bear against the arm 19.

Naturally, the arrangement in which at least one of the butterfly elements 5, 15 in the open position has a portion projecting into the third duct 2, and at least one of the butterfly elements 5, 15 in the closed position extends substantially adjacent to or indeed flush with the third duct 2, is applicable to any type of three-duct valve, e.g. having one inlet and two outlets, and with two butterfly elements controlled by one or two motors.

Similarly, the resistances 29 can be used in any type of three-port valve, in particular a valve having one inlet and two outlets. The heater means may be provided in one and/or the other of the ducts and may be of a structure different from that described.

In addition, the return direction of the springs and the return position of the butterfly elements may be different from those described above.

The valve can have numerous applications, in particular in the automobile industry, and more particularly, but not exclusively, in the intake circuit of an engine.

As a variant, the butterfly elements are actuated by means of two torque motors, each associated with one of the butterfly elements.

The invention claimed is:

1. A method of operating a valve, the valve comprising:
a body and drive means, the body comprising first and second ducts that open out into a third duct, wherein the first duct comprises a first shutter and wherein the second duct comprises a second shutter, and the drive means comprising a first transmission wheel and a second transmission wheel respectively associated with the first shutter and the second shutter, wherein the first and second transmission wheels are connected to an outlet shaft of an actuator motor that is movable between the closed and open positions for the ducts, said outlet shaft being provided with a single pinion in order to move the shutters,
the method comprising:
moving the second shutter in a closed position of the second shutter and simultaneously moving the first shutter in an position adjustable between an open position of the first shutter and a first closed position;
moving the second shutter in the closed position of the second shutter and simultaneously moving the first shutter in the first closed position; and
moving the second shutter in an open position and simultaneously moving the first shutter in a second closed position.

2. A method of operating a valve of an air intake circuit of an engine, said valve comprising a body comprising first and second ducts that open out into a third duct, wherein the first duct comprises a first shutter and wherein the second duct comprises a second shutter, the method comprising:
moving the second shutter in a closed position of the second shutter and simultaneously moving the first shutter in an position adjustable between an open position of the first shutter and a first closed position;
moving the second shutter in the closed position of the second shutter and simultaneously moving the first shutter in the first closed position; and
moving the second shutter in an open position and simultaneously moving the first shutter in a second closed position.

3. A valve, comprising:
a body comprising first and second ducts that open out into a third duct wherein the first duct comprises a first shutter connected to a first transmission wheel, the first transmission wheel comprises a gear stud to limit movement of the first transmission wheel with respect to the second transmission wheel, and the second duct comprises a second shutter connected to a second transmission wheel; and
drive means operatively connected to both the first and second shutter and arranged to move the shutters in:
a normal mode of operation in which the second shutter is held in a closed position and simultaneously the first shutter is adjustably movable in position between an open position and a first closed position;
a stop mode in which the second shutter is in the closed position and the first shutter is in the first closed position; and
a secondary mode of operation in which the second shutter is in the open position and the first shutter is in a second closed position,
the drive means comprising a first transmission wheel and a second transmission wheel respectively associated with the first shutter and the second shutter, wherein the first and second transmission wheels are connected to an outlet shaft of an actuator motor that is movable between the closed and open positions for the ducts, said outlet shaft being provided with a single pinion in order to move the shutters.

4. The valve according to claim 1, in which the actuator motor is a DC motor.

5. The valve according to claim 1, in which at least one of the first and second shutters in the open position has a portion projecting into the third duct.

6. The valve according to claim 5, in which said at least one shutter has a pivot shaft in the vicinity of the third duct.

7. The valve according to claim 1, in which at least one of the first and second shutters in the closed position extends substantially flush with the third duct.

8. The valve according to claim 7, wherein said at least one shutter has a pivot shaft in the vicinity of the third duct.

9. An apparatus, comprising:
an air intake circuit of an engine, the air intake circuit comprising:
a valve, said valve comprising:
a body defining first and second ducts that open out into a third duct wherein the first duct comprises a first shutter connected to a first transmission wheel, the second duct comprises a second shutter connected to a pair of arms having fingers received in a groove formed in a second transmission wheel; and
drive means operatively connected to both the first and second shutter and arranged to move the shutters in:
a normal mode of operation in which the second shutter is held in a closed position and simultaneously the first shutter is adjustably movable in position between an open position and a first closed position;
a stop mode in which the second shutter is in the closed position and the first shutter is in the first closed position; and
a secondary mode of operation in which the second shutter is in the open position and the first shutter is in a second closed position.

10. The apparatus of claim 9, wherein the drive means comprise a first transmission wheel and a second transmission wheel respectively associated with the first shutter and the second shutter, wherein the first and second transmission wheels are connected to an outlet shaft of an actuator motor that is movable between the closed and open positions for the ducts.

11. The apparatus of claim 10, wherein said outlet shaft is provided with a single pinion in order to move the shutters.

12. The apparatus of claim 10, in which the actuator motor is a DC motor.

13. The apparatus of claim 9, in which at least one of the first and second shutters in the open position has a portion projecting into the third duct.

14. The apparatus of claim 13, in which said at least one shutter has a pivot shaft in the vicinity of the third duct.

15. The apparatus of claim 9, in which at least one of the first and second shutters in the closed position extends substantially flush with the third duct.

16. The apparatus of claim 15, wherein said at least one shutter has a pivot shaft in the vicinity of the third duct.

17. A valve, comprising:
a body comprising first and second ducts that open out into a third duct wherein the first duct comprises a first shutter connected to a first transmission wheel, wherein the second duct comprises a second shutter connected to an arm, and wherein the arm is connected to a second transmission wheel; and drive means operatively connected to both the first and second shutter and arranged to move the shutters in:
- a normal mode of operation in which the second shutter is held in a closed position and simultaneously the first shutter is adjustably movable in position between an open position and a first closed position;
- a stop mode in which the second shutter is in the closed position and the first shutter is in the first closed position; and
- a secondary mode of operation in which the second shutter is in the open position and the first shutter is in a second closed position,
- the drive means comprising a first transmission wheel and a second transmission wheel respectively associated with the first shutter and the second shutter, wherein the first and second transmission wheels are connected to an outlet shaft of an actuator motor that is movable between the closed and open positions for the ducts, said outlet shaft being provided with a single pinion in order to move the shutters.

18. A valve, comprising:
- a body comprising first and second ducts that open out into a third duct wherein the first duct comprises a first shutter connected to a first transmission wheel and the second duct comprises a second shutter connected to a second transmission wheel;
- an arm connected to either the first or the second transmission wheel to limit movement of the other of the first and the second transmission wheel; and
- drive means operatively connected to both the first and second shutter and arranged to move the shutters in:
  - a normal mode of operation in which the second shutter is held in a closed position and simultaneously the first shutter is adjustably movable in position between an open position and a first closed position;
  - a stop mode in which the second shutter is in the closed position and the first shutter is in the first closed position; and
  - a secondary mode of operation in which the second shutter is in the open position and the first shutter is in a second closed position,
  - the drive means comprising a first transmission wheel and a second transmission wheel respectively associated with the first shutter and the second shutter, wherein the first and second transmission wheels are connected to an outlet shaft of an actuator motor that is movable between the closed and open positions for the ducts, said outlet shaft being provided with a single pinion in order to move the shutters.

* * * * *